C. F. GRIFFITH.
SHOCK ABSORBER.
APPLICATION FILED DEC. 11, 1912.

1,118,761.

Patented Nov. 24, 1914.

Witnesses

Inventor
C. F. Griffith.
By
Attorneys.

UNITED STATES PATENT OFFICE.

CHARLES F. GRIFFITH, OF BENTON, MISSOURI.

SHOCK-ABSORBER.

1,118,761.  
Specification of Letters Patent.  
Patented Nov. 24, 1914.

Application filed December 11, 1912. Serial No. 736,118.

*To all whom it may concern:*

Be it known that I, CHARLES F. GRIFFITH, a citizen of the United States, residing at Benton, in the county of Scott and State of Missouri, have invented certain new and useful Improvements in Shock-Absorbers, of which the following is a specification.

This invention relates to shock absorbers for vehicle running gear, and more particularly to a shock absorbing device designed primarily for use in connection with the front axle of a motor driven vehicle and it is the primary aim of the invention to provide in connection with the axle of such a vehicle a shock absorbing means which will be so constructed as to permit of the use of cushioned instead of pneumatic tires on the front wheels of the vehicle, and which will not interfere with the steering mechanism for the said front wheels.

Another aim of the invention is to so construct the shock absorbing device that the return of the vehicle body and supporting wheels to their normal relative positions will be cushioned and retarded to a sufficient degree to eliminate the bouncing motion usually given the vehicle body by the ordinary shock absorbing devices.

For a full understanding of the invention reference is to be had to the following description and accompanying drawing, in which:—

Figure 1:
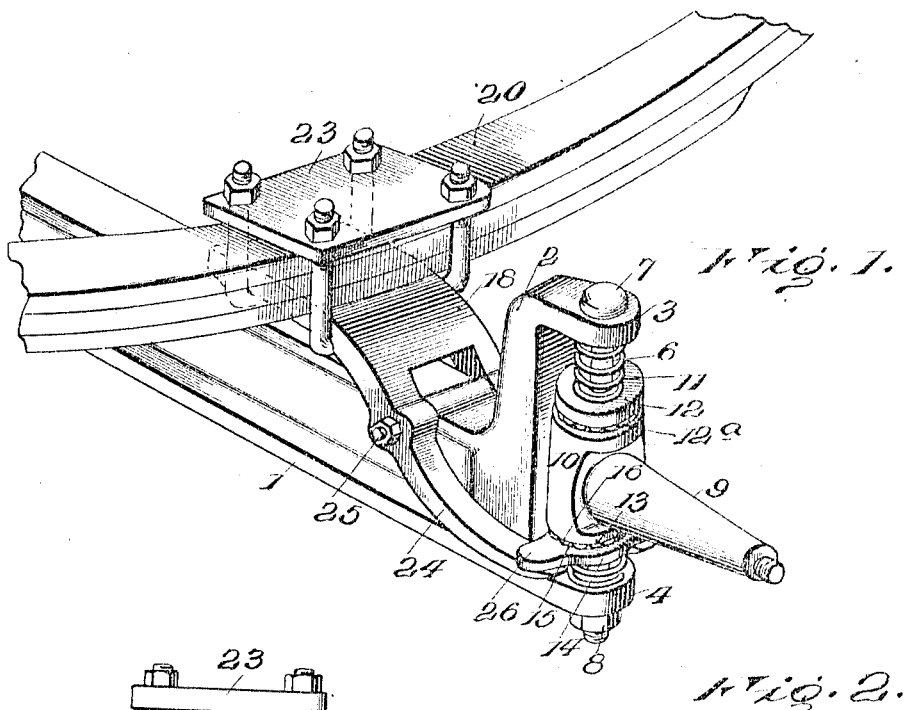
Figure 2:
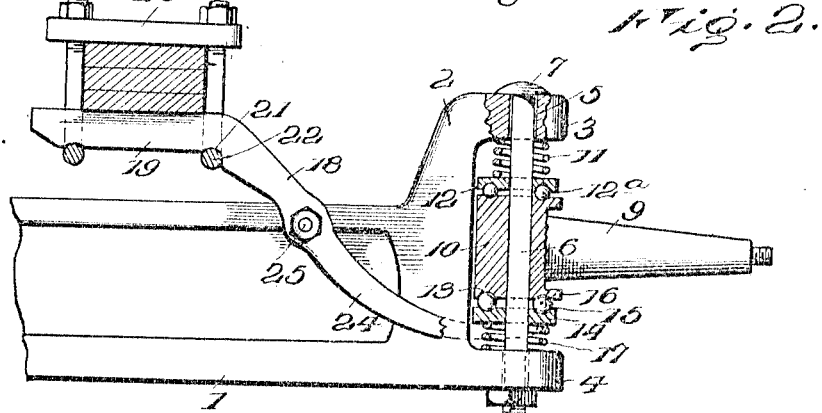
Figure 3:
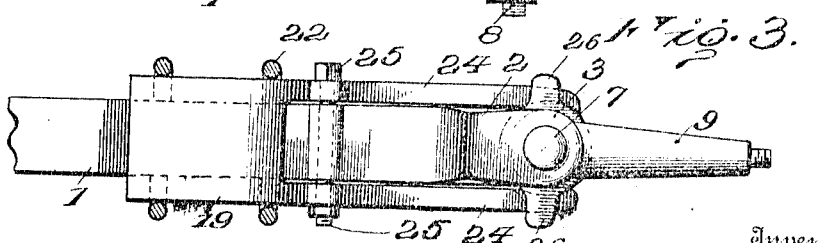

Figure 1 is a perspective view of the shock absorbing device embodying the present invention applied at one end of the forward axle of a motor driven vehicle. Fig. 2 is a view partly in front elevation and partly in section illustrating the shock absorbing device. Fig. 3 is a top plan view thereof.

Corresponding and like parts are referred to in the following description and indicated in all the views of the accompanying drawing by the same reference characters.

In the drawing the front axle is indicated by the numeral 1 and is provided at each end with a yoke 2 including spaced upper and lower ears 3 and 4, respectively. The ears 3 and 4 of the yoke are formed with vertically alined openings 5 through which is fitted a pin 6 provided at its upper end with a head 7 resting against the upper side of the ear 3 and having its lower end threaded and provided with a nut 8 bearing against the under side of the ear 4. This pin, as usual, supports for turning movement, a stud-axle and this axle is indicated in the drawing by the numeral 9 and projects laterally from a head 10 fitted for swinging movement upon the pin 6 in a manner clearly shown in Fig. 2 of the drawing. A spring 11 is fitted upon the pin 6 and bears at its upper end against the under side of the ear 3 and at its lower end against a washer 12 which is also fitted upon the pin. The washer 12 is formed in its under side with a ball-race and the head 10 is formed in its upper end with a similar race, bearing balls 12ª being arranged within the two races.

The head 10 is formed in its lower end with a ball-race 13 and slidably fitted upon the pin 6 is a bearing plate 14 provided in its upper side with a ball-race 15. Bearing balls 16 are arranged within the races 13 and 15 and the head 10 is in this manner supported for free turning movement, although considerable weight may be imposed upon it. For a purpose to be presently explained a buffer-spring 17 is fitted upon the pin 6 and rests upon the upper side of the ear 4.

Ordinarily, in shock absorbing devices of this type, the vehicle or body springs are supported directly upon the forward axle but in the instance of the present invention they are supported upon rockers which in turn are arranged to act against the tension of the springs 11. Each of these rockers is indicated in general by the numeral 18 and the upper portion thereof constitutes a head 19 upon the upper side of which is disposed the lower bow 20 of the respective body spring. The portion 19 of the rocker is formed in its under side with notches 21 in which are engaged the connecting portions of the clips 22 which extend up beside the bow 20 and are fitted through openings in a clip-plate 23 disposed against the upper side of the bow. The lower portion of the rocker 18 is bifurcated to form downwardly and laterally curved arms 24 which straddle the end portion of the axle 1, a pivot bolt 25 being fitted through the arms near their points of juncture with the integral portion of the rocker and fitted also through the said axle 1. In this manner the rocker is supported for oscillatory movement and when weight is imposed upon its inner end the same will be depressed and its outer end will be raised. The ends of the arms 24 of the rocker engage beneath outstanding lugs 26 which project from opposite sides of the bearing plate 14.

From the foregoing description of the invention it will be understood that when either of the front wheels strikes an obstruction or inequality in the road surface, upward pressure will be exerted against the head 10 which will be resisted by the spring 11. As the head 10 moves upwardly upon the pin 6, the arms 24 of the rocker will also swing upwardly due to the momentary expansion of the respective bow 20. The expansion of the bow 20 will be followed by a momentary lowering of the body of the vehicle but in the meantime the spring 11 will have resumed its normal condition, forcing down the head 10 and correspondingly swinging the arms 24 of the rocker and thereby elevating its head end 19 to exert compressive force against the bow.

It will be apparent that the buffer spring 17 will absorb or lessen the impact of the head 10 as it moves downwardly upon the pin 6.

Having thus described the invention what is claimed as new is:—

1. In vehicle running gear including a vehicle body supporting element, an axle, and a spindle supported by the axle for up and down movement, means interposed between the spindle and the said element providing for downward movement of the element upon upward movement of the spindle and upward movement of the element upon downward movement of the spindle.

2. In vehicle running gear including a vehicle body supporting element, an axle, and a spindle carried by the axle and movable up and down, means yieldably resisting the upward movement of the spindle, and lever means carried by the axle and coöperating with the said element and with the spindle to provide for downward movement of the element upon upward movement of the spindle and upward movement of the element upon downward movement of the spindle.

3. In vehicle running gear, an axle, a spindle supported thereby for up and down movement, and means for yieldably resisting the downward movement of the spindle, said means including a member mounted for rocking movement upon the axle and having a portion extending beneath the spindle, and a vehicle body supporting element supported by the said member.

4. In vehicle running gear, an axle, a spindle supported thereby for up and down movement, and means for yieldably resisting the downward movement of the spindle, said means including a rocker mounted for oscillation upon the axle and at one end engaging beneath the spindle, and a vehicle-body-supporting spring supported upon the other end of the said rocker.

5. In vehicle running gear, an axle, a spindle supported thereby for up and down movement, means yieldably resisting the upward movement of the spindle, and means yieldably resisting the downward movement of the spring, the last mentioned means including a rocker mounted upon the axle for oscillatory movement and having a portion at one side of its axis of oscillation engaging beneath the spindle and supporting the same, and a vehicle-body-supporting spring supported upon the rocker at the other side of the axis of oscillation thereof.

6. In a vehicle running gear, an axle, a spindle supported thereby for up and down movement, means yieldably resisting the upward movement of the spindle, a bearing plate supporting the spindle, a rocker mounted for oscillation upon the axle and having an arm projecting beneath the bearing plate and supporting the latter, the spindle being arranged for turning movement upon the bearing plate, and a vehicle-body-supporting element supported by the said rocker.

7. In vehicle running gear, an axle, a spindle supported thereby for up and down movement, means yieldably resisting the upward movement of the spindle, a bearing plate supporting the spindle, a rocker mounted for oscillation upon the axle and having an arm projecting beneath the bearing plate and supporting the latter, the spindle being arranged for turning movement upon the bearing plate, a vehicle-body-supporting element supported by the said rocker, and a buffer arranged beneath the bearing plate.

8. In vehicle running gear, an axle having a yoke including spaced ears, a pin extending beneath the ears, a spindle mounted for turning and up and down movement, upon the pin, a spring arranged upon the pin and yieldably resisting the upward movement of the spindle, a rocker mounted for oscillatory movement upon the axle including arms straddling the axle, a bearing-plate mounted for sliding movement upon the pin and supporting the said spindle, the said arms of the rocker projecting beneath the bearing-plate, and a vehicle-body-supporting element supported beneath said rocker.

9. In vehicle running gear, a body supporting member, a spindle, an axle supporting the spindle for up and down movement, the body supporting member being movable independently of the axle, and means interposed between the said member and spindle providing for their complemental movement.

10. The combination with vehicle running gear including a vehicle body supporting member and an axle carrying a spindle for up and down movement, the supporting member being movable independently of the axle, of means interposed between the spindle and supporting member for permitting the cushioned downward movement of the supporting member upon upward movement of the spindle and vice versa.

In testimony whereof I affix my signature in presence of two witnesses.

CHARLIE F. GRIFFITH. [L. S.]

Witnesses:
C. N. MOZLEY,
T. B. DUDLEY.